United States Patent [19]
Horton

[11] 3,817,172
[45] June 18, 1974

[54] MESH HEATED DIE
[75] Inventor: David Horton, London, England
[73] Assignee: Letraset International Limited, London, England
[22] Filed: Nov. 16, 1971
[21] Appl. No.: 199,131

[30] Foreign Application Priority Data
Nov. 17, 1970 Great Britain................... 54662/70

[52] U.S. Cl. ............................................... 101/31
[51] Int. Cl............................................ B44b 5/02
[58] Field of Search............. 101/31, 21, 25, 27, 9, 101/376, 379; 219/243–245

[56] References Cited
UNITED STATES PATENTS
477,627 6/1892 Carpenter............................ 101/31
2,032,767 3/1936 Rosten................................. 101/31
2,669,642 2/1954 Menges................................ 101/31
3,133,846 5/1964 Gandy.............................. 219/243 X
3,613,570 10/1971 Gladen.............................. 101/31 X Primary Examiner—Robert E. Pulfrey
Assistant Examiner—Edward M. Coven
Attorney, Agent, or Firm—Darby & Darby

[57] ABSTRACT

The invention concerns a die assembly for use in hot die and foil marking, comprising a cured silicone rubber die having a metal mesh heater element attached to its back, there being suitable current supply connections for the mesh.

4 Claims, 1 Drawing Figure

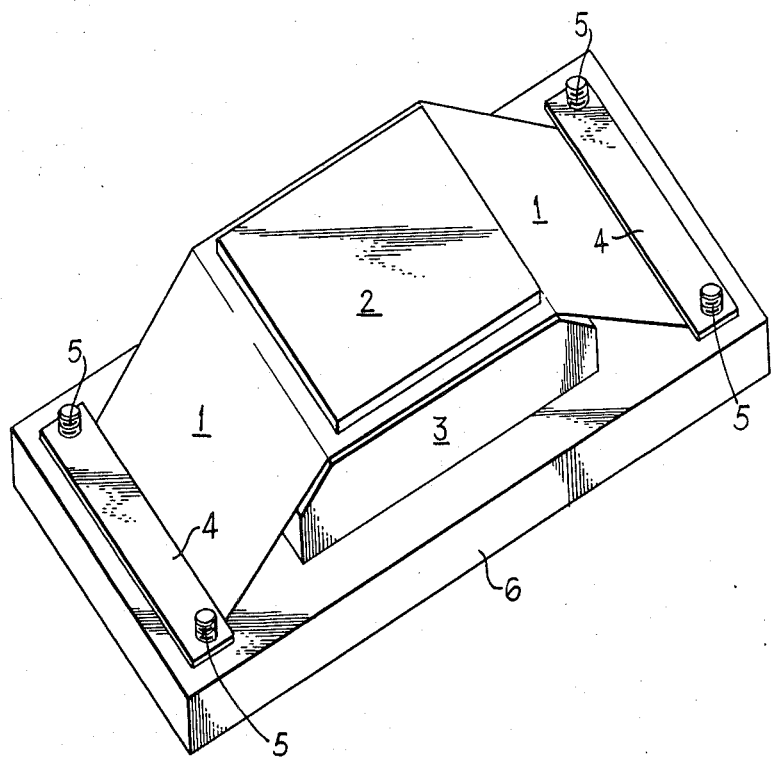

MESH HEATED DIE

This invention relates to hot die and foil marking.

In hot die and foil marking, a foil bearing a transferable dyed or pigmented material is sandwiched in a press between a die and the article to be marked under the application of heat and pressure. On removal of the die, the dyed or pigmented material remains on the article and the foil is stripped or falls away. Th dyed or pigmented material may be in the form of a layer of evenly dyed or pigmented material, areas of which are transferred to the article matching the areas of a relief die which contact the foil. Alternatively, the dyed or pigmented material may be in the form of one or more individually releasable designs, which, on the application of heat and pressure, are transferred bodily from the foil to the article to be marked. In this case, the die used has a plain surface.

The dies are usually made of metal and are mounted on a flat surface. Due to departures from flatness in the surface of the article being marked, marking may be patchy, and this is not easily avoided using metal dies. If, on the other hand, flexible resilient dies are used, e.g. made of silicon rubber, great difficulty is experienced in heating the die surface adequately. Either the die surface must be heated from outside — which leads to inconvenient and unwieldly equipment for moving eithe the presshead and heating head alternately over the die, or for moving the die to lie alternately under the presshead and under the heating means - or the die surface must be heated through the body of the die itself. Since silicone rubbers are not good heat conductors, this means that the back of the die would have to be very hot indeed to give a satisfactory face temperature, and that leads to unacceptable die degradation.

According to the present invention there is provided a die assembly which comprises a die of resilient material having attached to its back a diffuse surface heating element, and provided with means to attach separate parts of the heating element to a source of electrical current.

The preferred diffuse surface heating element is a backing sheet formed of a metal mesh, preferably a steel mesh.

The flexible resilient die portion is preferably formed of a high-temperature resistant silicone rubber material, e.g. one having an ability to work continuously at 240° C without losing its rubberlike properties. Types able to work intermittently at up to 300° C are also known and are useful in die assemblies of this invention.

The die portion may be one or two types — either the die may bear a relief design for use in hot-foil marking or, if desired, the die may merely have a flat surface and be used for transferring, under heat and pressure, a preformed image as a whole from a carrier bearing the image to a suitable substrate. The dies are preferably 0.7 to 1.5mm thick. The thickness of a backing sheet of steel foil or mesh for such a die may be, for example, 0.075mm.

When the diffuse surface heating element is, as preferred, a backing sheet of metal mesh, the die portion may be attached to the backing either by being cast onto the backing in uncured form and then subsequently cured in situ or it may be adhered to the backing by an interlayer of a suitable adhesive. In situ casting is the preferred technique. The mesh may be etched or pickled prior to attachment or moulding onto the die portion, in order to increase the bond and the thermal contact between them.

The die assemblies of the present invention are particularly advantageous in making articles which are not quite flat since their resilience and flexiblity allows them to be better conformed to the surface being marked. Preferably, in order to take advantage of the flexibility of the die assemblies, they are mounted on a die base of resilient material such as foamed silicone rubber.

The manufacture of die assemblies according to the present invention may take place in simple fashion. If the die assembly is to have a plain surfaced die portion, then the method is very simple: the backing and a suitable quantity of silicone or like elastomer, in uncured condition, are compressed in a press to give a layer of silicone of the desired thickness, and the elastomer is then heat-cured in situ. Excess elastomer may be trimmed off afterwards.

In the manufacture of assemblies in which the die portion bears an image, the preferred mode of manufacture is as follows:

1. Prepare a normal zinco printing plate in customary fashion.

2. Prepare a plastics master from that plate by compressing the plate together with a sheet of heat-curable thermosetting plastics precursor e.g. a sheet of half-cured bakelite.

3. Make a sandwich of backing material, heat-curable elastomer and plastics master, and hot press this to the required thickness and for a time sufficient to cure the elastomer, which will stay bonded to the backing. The plastics master is then stripped off, leaving the finished die assembly.

In either case, the assembly so formed is then placed on a suitable electrically insulating base and connections made to the backing to enable the die to be heated by passage of an electric current. Preferably, between the die portion and the insulating base is a resilient cushion, e.g. of foamed silicone rubber, to allow the die to flex and adapt to the contours of the article being marked.

In transfer marking it is often valuable to provide such a cushion and to provide it slightly domed. This in turn causes the die to be slightly domed and thus, in transfer marking, the pressure is applied from the centre of the transfer on its carrier and working outwardly. This in turn minimizes the risk of any air being entrapped under the transfer and gives a very clean and reliable transfer operation.

Purely by way of example, the invention is illustrated in the accompanying drawing which is a diagrammatic perspective view from above of a die assembly according to the invention.

Referring to the drawing, the die assembly consists of a steel mesh backing 1 of plain weave. The steel mesh is made of wires each 0.063 mm thick, at a density of 80 wires per cm. Onto this mesh has been cast a die 2 of silicone rubber e.g. Gillibrands GP 50 Shore rubber or Midland Silicones Silastomer (Trade Mark) type 2438/50–70. Prior to casting, the mesh was etch primed to improve adhesion.

The surface of the die remote from the mesh backing 1 is flat for transfer marking or bears a raised relief design for foil marking.

The mesh 1 is held under tension over a cushion of foam silicone rubber 3 by means of two conductive metal strips 4, held down by brass screws 5, onto one of which at each end of the assembly electrical connection is made in use. The whole assembly is mounted on a base 6 of electrically insulative plastics material.

In use, the assembly as shown in the drawing is located where desired in a press, and electrical connection made to opposite ends of the mesh 1.

It is found that, using a steel mesh as defined above, at a die width of 5.0cm and length 7.5cm, the die may be heated quickly and accurately to 200° C by passing a current of 12 amps through the steel mesh from a supply voltage of 6 volts.

It is found that the support of the die as just described is firm and not liable to change in shape. Heating up of the die is quick and even, and temperature control could be easily exercised. Thermal response time of the system was short. When used for hot foil marking at a die surface temperature of 120°–180° C, it was found that the die gave satisfactory even marking in all cases. When used for transfer marking at a die face temperature of 200°–220° C, satisfactory results were also obtained.

What we claim is:
1. A die assembly which comprises
    a supporting base;
    a resilient cushion on said base;
    a die of resileint material;
    an electrically heatable flexible metal mesh attached in a heat-conducting relationship to the rear side of said die, said metal mesh including end portions extending outwardly from said die of resilient material, the mesh being positioned between said die and the resilient cushion;
    means for securing the end portions of said mesh to said base, said securing means pulling said metal mesh against said cushion thereby exerting a compressive force on said cushion and creating tensile forces within said metal mesh; and
    means for connecting said end portions to a source of electric current to enable a flow of current through said mesh for heating said die.

2. A die assembly according to claim 1, wherein the die is formed of cured silicone rubber.

3. A die assembly according to claim 2, wherein said metal mesh is made of steel and said die comprises silicone rubber cast on said steel mesh.

4. A die assembly according to claim 2, wherein the die is 0.75 to 3 mm thick.

* * * * *